United States Patent [19]
Mochizuki et al.

[11] Patent Number: 5,321,435
[45] Date of Patent: Jun. 14, 1994

[54] MULTI-DIAMETER RECORD DOT LIGHT SCANNING APPARATUS

[75] Inventors: Takeshi Mochizuki; Susumu Saito; Shinichi Nishino; Takahiro Kikuchi, all of Ibaraki; Akira Arimoto, Tokyo, all of Japan

[73] Assignees: Hitachi Koki Co., Ltd.; Hitachi Ltd., both of Tokyo, Japan

[21] Appl. No.: 144,508

[22] Filed: Nov. 2, 1993

Related U.S. Application Data
[63] Continuation of Ser. No. 744,722, Aug. 14, 1991, abandoned.

Foreign Application Priority Data
Aug. 24, 1990 [JP] Japan ............... 2-221352

[51] Int. Cl.⁵ ............. H04N 1/21; B41J 2/435
[52] U.S. Cl. ........................ 346/108; 358/298
[58] Field of Search ........... 346/1.1, 108, 107 R, 346/76 L, 160, 358/296, 298, 300, 302

[56] References Cited
U.S. PATENT DOCUMENTS

| | | | |
|---|---|---|---|
| 4,232,344 | 11/1980 | Sakamoto et al. | 358/298 |
| 4,539,478 | 9/1985 | Sano . | |
| 4,630,070 | 12/1986 | Sato | 346/108 |
| 4,642,701 | 2/1987 | Maeda et al. . | |
| 4,651,169 | 3/1987 | Muka . | |
| 4,916,318 | 4/1990 | Iima | 250/568 |
| 5,045,868 | 9/1991 | Tajima | 346/108 |
| 5,151,586 | 9/1992 | Sato et al. | 346/108 |
| 5,157,650 | 10/1992 | Ozue et al. | 369/111 |
| 5,196,692 | 3/1993 | Arimoto et al. | 359/254 |

FOREIGN PATENT DOCUMENTS
| | | |
|---|---|---|
| 57-164759 | 10/1982 | Japan . |
| 58-40742 | 9/1983 | Japan . |
| 61-66465 | 4/1986 | Japan . |
| 62-275214 | 11/1987 | Japan . |
| 63-31270 | 2/1988 | Japan . |

Primary Examiner—Mark J. Reinhart
Attorney, Agent, or Firm—Sughrue, Mion, Zinn, Macpeak & Seas

[57] ABSTRACT

A light scanning device has a light deflector for deflecting in a scanning mode a light beam outputted by a light source; and an optical system for image-forming on a scanning medium the light beam deflected by the light deflecting means, with a convergent or divergent light beam in an optical path between the light source and the scanning medium. A plane-parallel plate is moved into and out of the optical path of the convergent or divergent light beam, so as to change a beam spot diameter on the scanning medium.

8 Claims, 3 Drawing Sheets

MULTI-DIAMETER RECORD DOT LIGHT SCANNING APPARATUS

This is a continuation of application Ser. No. 07/744,722 filed Aug. 14, 1991 abandoned.

FIELD OF THE INVENTION

This invention relates to light scanning apparatuses, and more particularly to a light scanning apparatus suitable for an electrophotographic printing machine such as a laser printer which is employed as a data printer.

BACKGROUND OF THE INVENTION

With advanced data processing techniques, there have been provided a variety of printing modes, which requires a method for expression of dots in which a print dot density can be changed with one and the same printer. For this purpose, it is necessary to provide a method of changing a record dot diameter. In the case of a laser beam printer, a method of changing a scanning laser beam power to thereby change a record dot diameter is well known in the art. For instance, Japanese Patent Application Publication No. 40742/1983 has disclosed a method in which an optical filter is disposed in the optical path of the output beam of a laser oscillator, to change the quantity of light and to thereby change the record dot diameter. However, in certain cases, specifically in a case where a suitable amount of exposure of the photosensitive drum to obtain predetermined print density is required, and where a correct amount of exposure of a print start position determining sensor are taken into consideration, the prior art optical filter method is problematic. Specifically, in order to maintain high print quality, the range is limited in which the quantity of light is allowed to change. In the case of Japanese Patent Application (OPI) No. 66465/1986 (the term "OPI" as used herein means an "unexamined published application"), the drive current of a semiconductor laser is adjusted to change the beam power, and to thereby change the record dot diameter. However, in this case, in addition to the above-described problem, another problem occurs. Specifically, in the adjustment of the drive current, the semiconductor laser oscillation threshold current changes with temperature, as a result of which the beam power is changed, and accordingly the record dot diameter is unstable. On the other hand, the record dot diameter changes substantially in proportion to the drive current when a heavy beam is used with low power. Therefore, the method raises another problem in that the record dot is low in sharpness. Furthermore, in the case where it is required to change the record dot diameter in a wide range, the aforementioned proportional relationship between record dot diameter and drive current is not established; that is, it is necessary to abruptly increase the drive current as the record dot diameter increases. This can be readily understood from the fact that the intensity of a laser beam assumes a Gaussian distribution.

In another example of the conventional record dot diameter changing method, a plurality of beams are combined to change the record dot diameter. For instance Japanese Patent Application (OPI) No. 164759/1982 employs an array laser; however, since a plurality of laser beams are employed, it is rather difficult to physically arrange the array laser.

In another example of a conventional record dot diameter changing method, a lens stop is provided in the light beam to change the beam diameter on the scanning surface. For instance, in the case of Japanese Patent Application (OPI) No. 31270/1988, a board having a plurality of holes different in diameter is disposed on the light source side of a rotary polygon mirror. However, the method is still disadvantageous in that the center of the beam must be in alignment with each of the holes formed in the board, a loss of power occurs because part of the beam is blocked, and a diffraction pattern is formed. Japanese Patent Application (OPI) No. 275214/1987 has disclosed a method of changing a beam diameter by using an electro-optical switch array and a polarizing plate; however, it is still disadvantageous in that the elements are expensive.

In another example of the conventional record dot diameter changing method, a plurality of optical paths are employed which provide different beam diameters on the scanning surface, and one of the optical paths is selected by a switching means (cf. U.S. Pat. Nos. 4,539,478 and 4,642,701). However, the method gives rise to another problem that, because of the plurality of optical paths, it is rather difficult to physically arrange the relevant components.

Furthermore, in another example of a conventional record dot diameter changing method, the beam diameter on the scanning surface is changed (cf. U.S. Pat. No. 4,651,169). In this method, the lens must be moved with high accuracy, and the optical axis must be positioned with high precision. Accordingly, it is considerably difficult to practice the method with a simple mechanism.

SUMMARY OF THE INVENTION

Accordingly, an object of this invention is to eliminate the above-described difficulties accompanying a conventional record dot changing method.

More specifically, an object of the invention is to provide a light scanning device which is simple in arrangement and is able to change a record dot diameter in a wide range.

The foregoing object and other objects of the invention have been achieved by the provision of a light scanning device comprising: light deflecting means for deflecting in a scanning mode the output light beam of a light source; and an optical system for image-forming on a scanning medium the light beam deflected by the light deflecting means, with a convergent or divergent light beam in an optical path between the light source and the scanning medium, which, according to the invention, further comprises: a refractive member which is inserted into the optical path of the convergent or divergent beam, so as to change a beam spot diameter on the scanning medium.

In order to change the diameter of a light beam on a scanning surface (hereinafter referred to as "a spot", when applicable), the invention is based on the following facts. First, as the position where the image of a light beam is formed is increasingly moved away from the scanning surface, the dot diameter changes. Second, the position where the image of a convergent or divergent light beam is formed on the scanning surface is shifted by changing the optical distance of a lens system disposed in the optical path of the light beam. Third, the optical distance can be changed by inserting a plane-parallel plate in the optical path with the position of the lens system maintained unchanged.

The nature, principle and utility of the invention will become more apparent from the following detailed description when read in conjunction with the accompanying drawings.

DETAILED DESCRIPTION OF THE PREFERRED EMBODIMENTS

Preferred embodiments of this invention will be described with reference to the accompanying drawings.

Figure 1:
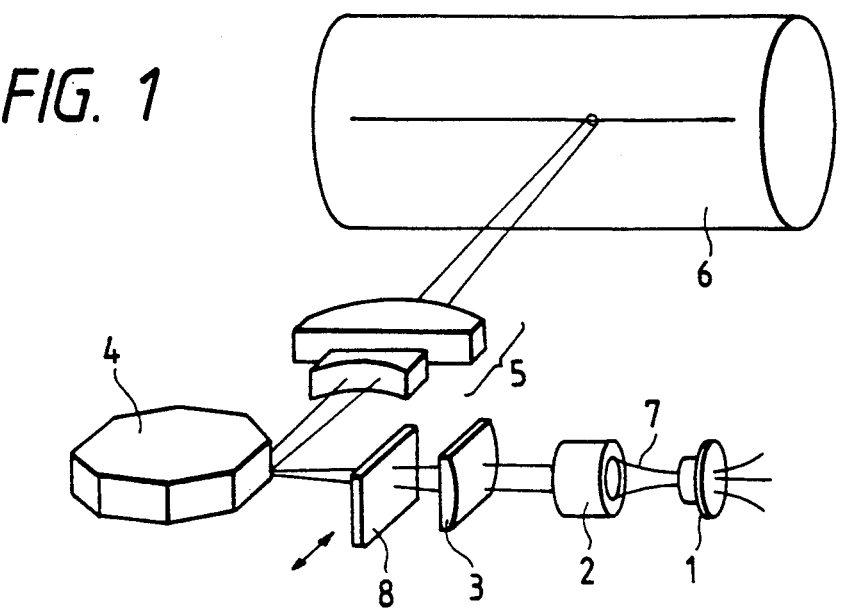
FIG. 1 is an explanatory diagram showing the arrangement of an example of a light scanning device which constitutes a first embodiment of this invention.

A first embodiment of the invention, which is a laser printer to which the technical concept of the invention is applied, is as shown in FIG. 1. In FIG. 1, reference numeral 1 designates a light source; 2, a collimator lens; 3, a cylindrical lens; 4, a rotary polygon mirror; 5, an Fθ lens; 6, a photosensitive drum; 7, a light beam; and 8, a plane-parallel plate.

The light beam 7 from the light source is converted into a parallel light beam by the collimator lens 2. The parallel light beam is applied to the cylindrical lens 3, where it is converted into a light beam which is flattened in the scanning vertical direction, so that a linear image is formed in the vicinity of the reflecting surface of the rotary polygon mirror 4. The Fθ lens is an anamorphic aspherical lens which is positioned so that, in the scanning direction the infinite point and the photosensitive drum surface are in conjugation with each other, and in the scanning vertical direction the vicinity of the reflecting surface of the rotary polygon mirror and the photosensitive drum surface are in conjugation with each other. Hence, the linear image formed in the vicinity of the reflecting surface of the rotary polygon mirror is formed on the photosensitive drum surface. The diameter of the light spot formed on the photosensitive drum surface can be changed by inserting the plane-parallel plate 8 in the optical path of a convergent or divergent beam. In the embodiment, the plane-parallel plate 8 is placed between the cylindrical lens and the rotary polygon mirror.

In the case of a laser printer, in general, the beam spot diameter is changed in response to a record dot density changing instruction (for instance from 240 dpi (dots per inch) to 480 dpi) provided by a well-known control unit of the laser printer.

A new modulation frequency corresponding to a desired record dot density is applied to the light source 1 which is for instance a semiconductor laser. The speed of rotation of the rotary polygon mirror 4 is also changed (increased or decreased) in accordance with the given record dot density.

Figure 2:
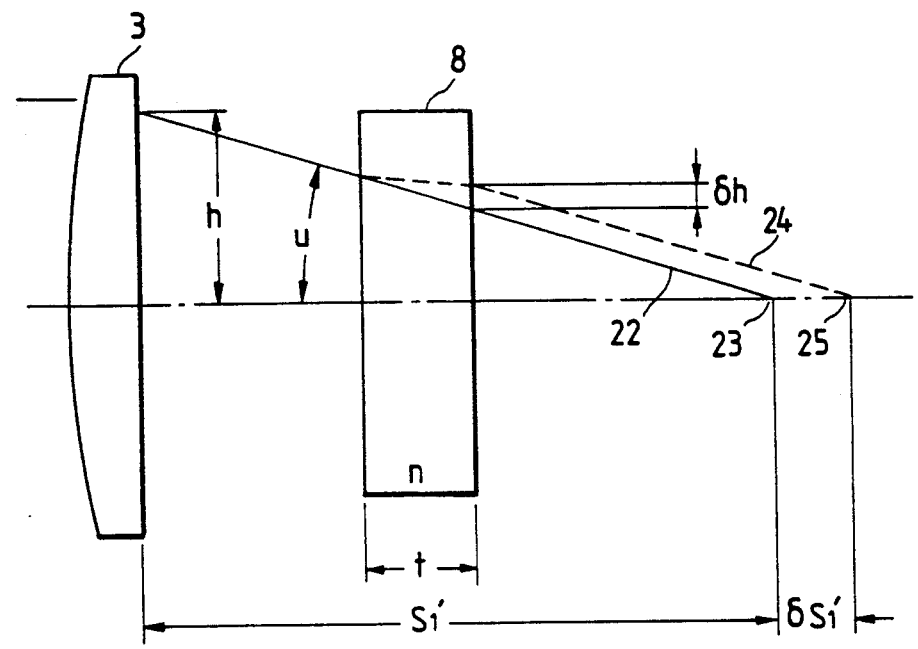
FIGS. 2 and 3 are explanatory diagrams for a description of the principle of the invention.

FIG. 2 shows the displacement of the image point which is caused by the insertion of the plane-parallel plate. In FIG. 2, reference numeral 8 designates the aforementioned plane-parallel plate; 22 and 23, a light beam and an image point in the vicinity of the reflecting surface of the rotary polygon mirror, respectively, in the case where no plane-parallel plate 8 is inserted; 24 and 25, a light beam and an image point in the vicinity of the reflecting surface of the rotary polygon mirror, respectively, in the case where the plane-parallel plate 8 is inserted; and 3, the aforementioned cylindrical lens (which is flat on one side and convex on the other side). A paraxial ray h in height which has passed through the cylindrical lens 3 advances forming an angle u with the optical axis, and intersects the optical axis at the image point 23. The distance $S_1'$ between the cylindrical lens 3 and the image point 23 is as follows:

$$S_1' = h/u \tag{1}$$

Where the plane-parallel plate 8 has a refractive index n and a thickness t, the light beam is as indicated at 24, intersecting with the optical axis at the image point 25. In the plane-parallel plate 8, the light beam advances forming an angle u/h with the optical axis. Therefore, the difference δh in height between the light beams 22 and 24 passed through the plane-parallel plate can be represented by the following equation (2):

$$\delta h = u\, t(1 - 1/n) \tag{2}$$

If it is assumed that the distance between the image points 23 and 25 is represented by $\delta S_1'$, then the following equation (3) is obtained from the above-described equations (1) and (2)

$$\begin{aligned}\delta S_1' &= \delta h/u \\ &= t(1 - 1/n)\end{aligned} \tag{3}$$

That is the insertion of the plane-parallel plate n in refractive index and t in thickness in the optical path of the convergent beam moves the image point as much as t (1−1/n)

Figure 3:
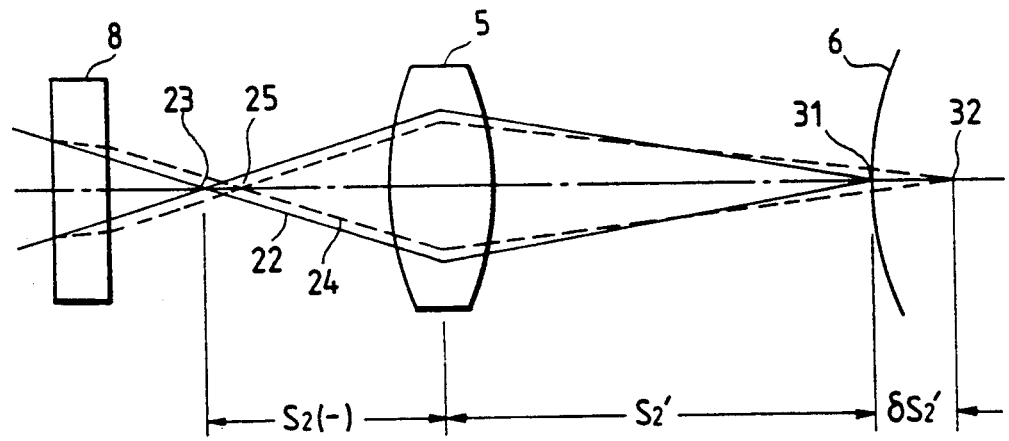

FIG. 3 shows the displacement of the image point on the drum surface which is caused by the insertion of the plane-parallel plate. In FIG. 3, reference numeral 5 designates the aforementioned Fθ lens; 8, the aforementioned plane-parallel plate; 22, 23 and 31, a light beam, an image point in the vicinity of the rotary polygon mirror, and an image point in the vicinity of the photosensitive drum surface, respectively, in the case where no plane-parallel plate is inserted; and 24, 25 and 32, a light beam, an image point in the vicinity of the rotary polygon mirror, and an image point in the vicinity of the photosensitive drum surface, respectively, in the case where the plane-parallel plate is inserted.

In the case where no plane-parallel plate is inserted, the light beam advances as indicated at 22, thus being image-formed on the photosensitive drum. If, in this case, it is assumed that the distance between the Fθ lens and the image point 23 and the distance between the Fθ lens and the image point 31 are represented by $S_2(-)$ and $S_2'$, respectively, and the power of the Fθ lens is represented by $\psi$, then the following equation (4) is established:

$$1/S_2' = 1/S_2 = \psi \qquad (4)$$

In this case, the F$\theta$ lens is approximated as a thin lens. When the plane-parallel plate is inserted, then the image point in the vicinity of the reflecting surface of the rotary polygon mirror is displaced as much as $\delta S_1'$ (see FIG. 2), and therefore the image point 31 (see FIG. 3) on the drum surface is displaced as much as $\delta S_2'$ to the image point 32. The following equation (5) is thus established:

$$1/(S_2' + \delta S_2') = 1/(S_2 + \delta S_1') + \psi \qquad (5)$$

From the above-described equations (4) and (5), the following equation (6) is obtained:

$$\delta S_2' = \delta S_1'/[\{1 + \psi(S_2 + \delta S_1')\}(1 + \psi S_2)] \qquad (6)$$

In general, a laser beam is a Gaussian beam the section of which is as indicated by the following equation (7) in intensity distribution:

$$I(x) = I_0 \exp\{-2(x/r_0)^2\} \qquad (7)$$

where x is the distance from the beam center; $I_0$ is the intensity of the beam center; and $r_0$ is the spot radius. In the case of a Gaussian beam, the spot radius is defined by the distance from the beam center where the intensity becomes $1/e^2$ of that of the beam center. If it is assumed that the spot radius at the beam waist is represented by $r_0$, the spot radius $r_1$ at the distance $\xi S'_2$ from the beam waist is as follows:

$$r_1 = r_0 \sqrt{(\lambda \, \delta S_2'/\Pi r_0^2)^2} \qquad (8)$$

where $\lambda$ is the wavelength.
The beam waist is the point on the optical axis where the spot radius of the Gaussian beam is minimum. In the vicinity of the beam waist, the intensity $I_0'$ on the optical axis is related to the spot radius r as follows:

$$I_0' r = \text{const} \qquad (9)$$

From equations (7), (8) and (9), the intensity distribution I'(x) at a short distance $\delta S_2'$ from the beam waist is:

$$I'(x) = I_0(r_0/r_1)\exp\{-2(x/r_1)^2\} \qquad (10)$$

Assuming that the spot diameter at the beam waist corresponds to the record dot diameter, a beam intensity threshold value Ith to determine a record dot diameter can be represented by the following equation (11):

$$Ith = I_0/e_2 \qquad (11)$$

This relation is substituted in equation (10) to solve for x, and equations (3), (6) and (8) are utilized. As a result, the following equation (12) is obtained:

$$x = r_0 \sqrt{1 + k(t)} \sqrt{1 - \ln \sqrt{1 + k(t)}} \qquad (12)$$

where k(t) is represented by the following equation (13):

$$k(t) = \left[ \frac{\lambda t(1 - 1/n)}{x r_0^2 \left[1 + \phi(S_2 + t(1 - 1/n))\right](1 - \phi S_2)} \right]^2 \qquad (13)$$

The spot diameter $\lambda$ on the scanning surface can be represented by the following equation (14):

$$\delta = 2x \qquad (14)$$

As is seen from equations (12), (13) and (14), the insertion of the plane-parallel plate, n in refractive index and t in thickness, changes the scanning spot diameter.

The propagation of the Gaussian beam is described in the publication "Gaussian Beam Propagation", *The Bell System Technical Journal*, Feb. 1966, pp. 287–299.

Figure 4:
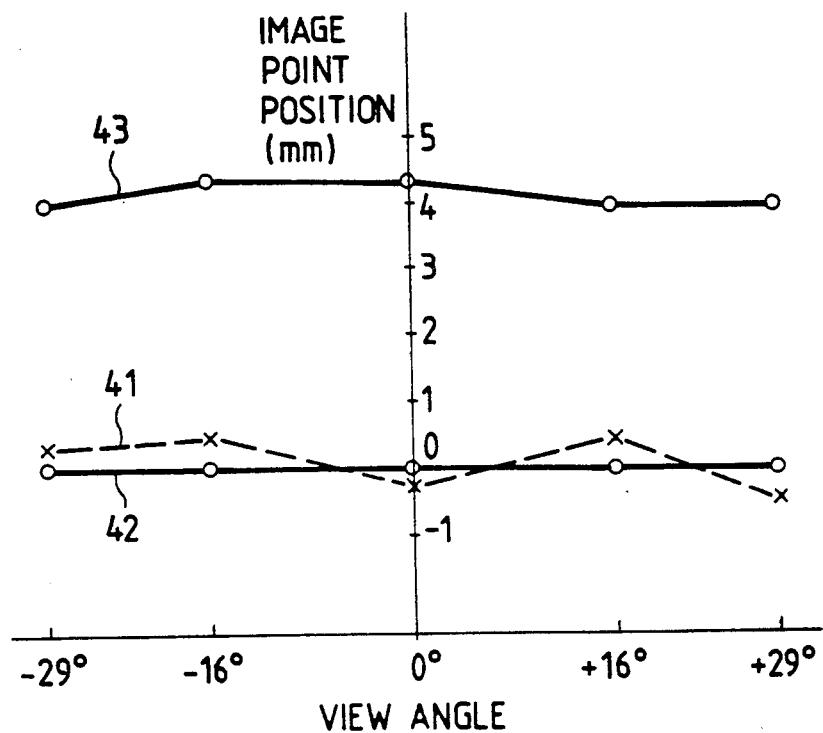
FIG. 4 is a graphical representation showing an image forming characteristic of the light scanning device shown in FIG. 1.

FIG. 4 shows the displacement of the image point on the drum surface over the entire scanning area in the case where, in the optical arrangement shown in FIG. 1, the cylindrical lens 3 and the F$\theta$ lens are 59 mm and 280 mm in focal length, respectively, and the plane-parallel plate inserted is 1.51 in refractive index and 1.1 mm in thickness. In FIG. 4, reference numeral 41 designates the positions of the image point in the scanning direction, which are constant independently of the insertion of the plane-parallel plate; 42, the positions of the image point in the scanning vertical direction in the case where no plane-parallel plate is inserted; and 43, the positions of the image point in the scanning vertical direction in the case where the plane-parallel plate is inserted.

Figure 5:
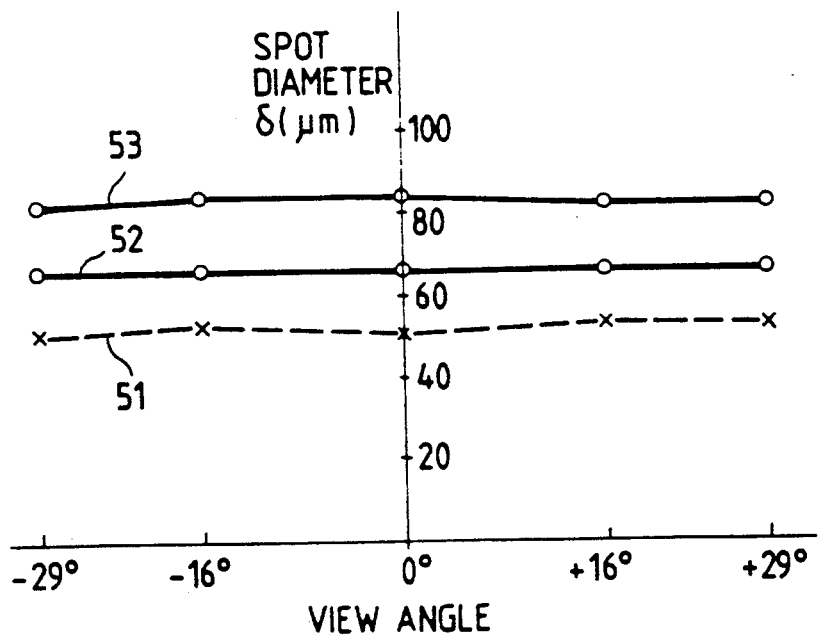
FIG. 5 is a graphical representation showing spot diameters provided by the light scanning device shown in FIG. 1.

On the other hand, FIG. 5 shows spot diameters in correspondence to the image point positions shown in FIG. 4. More specifically, in FIG. 5, reference numeral 51 designates spot diameters in correspondence to the positions of the image point in the scanning direction; 52, spot diameters in correspondence to the positions of the image point in the case where no plane-parallel plate is inserted; and 53, spot diameters in correspondence to the positions of the image point in the case where the plane-parallel plate is inserted.

As is apparent from FIGS. 4 and 5, with the plane-parallel plate inserted in the optical path, only in the vertical scanning direction is the spot diameter changed, and the change is substantially uniform in the entire scanning area. In the above-described embodiment, in the scanning direction, the spot diameter is not changed because the parallel beam is provided at the plane-parallel plate. If, in this case, it is required to change the record dot diameter in the scanning direction, the modulation time should be changed.

The following Table 1 indicates record dot diameters in the scanning vertical direction, including record dot diameters in the case where the plane-parallel plate is inserted in the optical path and record dot diameters in the case where the laser beam power is changed. It can be understood from Table 1 that the record dot diameter can be changed in a wide range by employing the insertion of the plane-parallel plate in the optical path and the variation of the laser beam power.

TABLE 1

| Plane-parallel Plate Item | Plane-parallel plate (t = 1.1 mm) | | |
|---|---|---|---|
| | Not Used | Used | Used |
| Image point | 0 | +4.3 mm | +4.3 mm |

TABLE 1-continued

| Plane-parallel plate (t = 1.1 mm) | | | |
|---|---|---|---|
| Plane-parallel Plate Item | Not Used | Used | Used |
| displacement on the scanning surface | | | |
| Laser beam power ratio | 1 | 1 | 2 |
| Spot diameter δ | 66 μm | 84 μm | 84 μm |
| Record dot diameter d | 66 μm | 91 μm | 110 μm |

Figure 7:
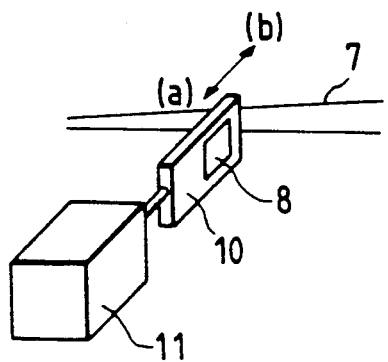
FIG. 7 is an explanatory diagram showing a plane-parallel plate driving section in the light scanning device.

FIG. 7 shows one example of a plane-parallel plate drive section. The plane-parallel plate drive section comprises: the above-described plane-parallel plate 8, a plane-parallel plate holder 10; and an electric motor 11 for driving the plane-parallel plate holder 10. The plane-parallel plate holder 10 is movable in directions (a) and (b). In this case of a small record dot diameter, the holder 10 is moved in the direction (a) so as not to block the light beam 7, whereas in the case of a large record dot diameter, it is moved in the direction (b) so as to be inserted in the light beam.

Figure 6:
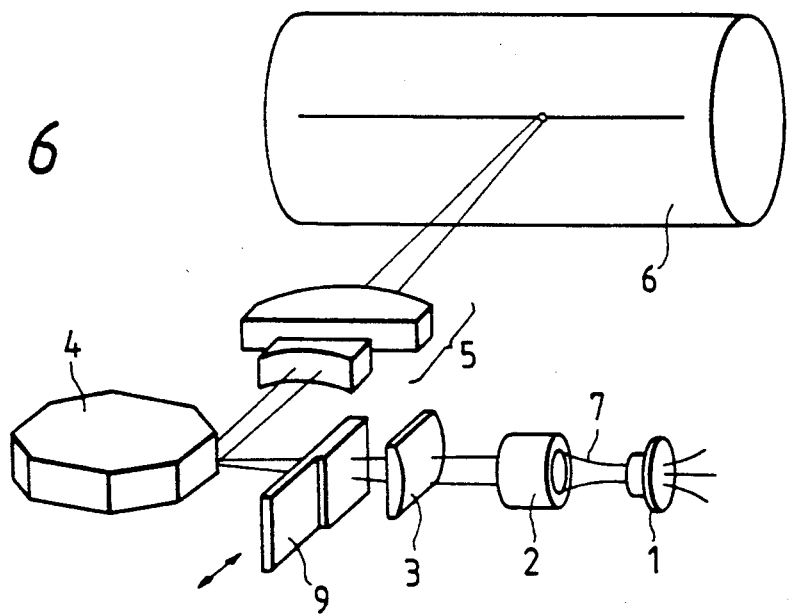
FIG. 6 is an explanatory diagram showing the arrangement of another example of the light scanning device which constitutes a second embodiment of the invention.

A second embodiment of the invention is as shown in FIG. 6. The second embodiment is different from the first embodiment shown in FIG. 1 in that, instead of the plane-parallel plate, a stepped plate; i.e., a plate having two different thicknesses is employed as shown in FIG. 6. In the second embodiment, the dot density can be changed in three steps by moving the plate 9 into and out of the light beam 7. In this case, the record dot diameter is changed as indicated in the following Table 2 for instance.

TABLE 2

| Plane-parallel plate (t = 1.1 mm) | | | |
|---|---|---|---|
| Plane-parallel plate Item | Not Used | Used t = 1.1 mm | Used t = 1.6 mm |
| Image point displacement on the scanning surface | 0 | +4.3 mm | +4.3 mm |
| Laser beam power ratio | 1 | 1 | 2 |
| Spot diameter δ | 66 μm | 84 μm | 98 μm |
| Record dot diameter d | 66 μm | 91 μm | 110 μm |

In the above-described embodiments, the plane-parallel plate is inserted in the space between the cylindrical lens 3 and the rotary polygon mirror 4. However, it should be noted that the effect of the invention can be obtained by inserting the plane-parallel plate in the optical path of a convergent or divergent light beam. For instance, the same effect can be obtained by inserting the plane-parallel plate into the space between the rotary polygon mirror 4 and the Fθ lens 5. In addition, the plane-parallel plate may be inserted into the space between the light source and the collimator lens, or the space between the Fθ lens and the photosensitive drum. In this case, the spot diameter is changed also in the scanning direction; however, the spot diameter in the scanning direction can be adjusted by changing the modulation time.

Furthermore, in the second embodiment shown in FIG. 6, the spot diameter is changed by using the plane-parallel plate having two different thicknesses. However, it goes without saying that the invention can be embodied by using a plane-parallel plate having more than two thicknesses.

While the invention has been described in connection with the preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A light scanning device for an electrophotographic printing machine including light deflecting means for deflecting in a scanning mode a light beam outputted by a light source, and an optical system for image-forming said light beam deflected by said light deflecting means, said device comprising:
   means for modulating said light beam in accordance with an image signal;
   image recording means, onto which said light beam is directed by said optical system for recording an image based on said light beam;
   means which is inserted into said optical path at one of convergent and divergent portions of said light beam, for changing a beam spot diameter on said image recording means, said means for changing being a plane-parallel plate.

2. A light scanning device as claimed in claim 1, in which a plurality of refractive members are provided in correspondence to different beam spot diameters to be switched.

3. A light scanning device as claimed in claim 1, which further comprises a drive unit for moving said refractive member into and out of said optical path.

4. An electrophotographic printing machine comprising:
   means for inserting, in response to a print dot density switching instruction from a control unit, a refractive member into the optical path of one of a convergent and a divergent laser beam from a laser beam source to change a beam spot diameter thereof; and
   means for changing the modulating frequency of a modulating means provided for said laser beam source, and means for changing the speed of rotation of a rotary polygon mirror, thereby to change a print dot density.

5. An electrophotographic printing machine comprising:
   a plurality of refractive members, each having a unique refractive index; and
   means for modulating a light beam in accordance with an image signal;
   means for inserting, in response to a print dot density switching instruction from a control unit, one of said plurality of refractive members into an optical path of said light beam to change a beam spot diameter on a scanning medium.

6. An electrophotographic printing machine comprising:
   means for modulating a light beam in accordance with an image signal;
   a control unit for issuing a plurality of switching instructions each for setting the beam spot diameter of beam spots formed by said light beam to a different value; and
   an inserter responsive to said switching instructions from said control unit for inserting a refractive member having a refractive index selected by each switching instruction.

7. A light scanning device as claimed in claim 1, in which said light beam in an optical path between said light source and said light deflecting means one of converges and diverges in a direction perpendicular to the scanning direction and said beam spot diameter on said scanning medium changes in the direction perpendicular to said scanning direction by said refractive member.

8. A light scanning device as claimed in claim 1, in which said light beam in an optical path between said light source and said scanning medium one of converges and diverges only in a direction perpendicular to the scanning direction and said beam spot diameter on said scanning medium changes only in the direction perpendicular to said scanning direction by said refractive member.

* * * * *